United States Patent Office 2,799,388
Patented July 16, 1957

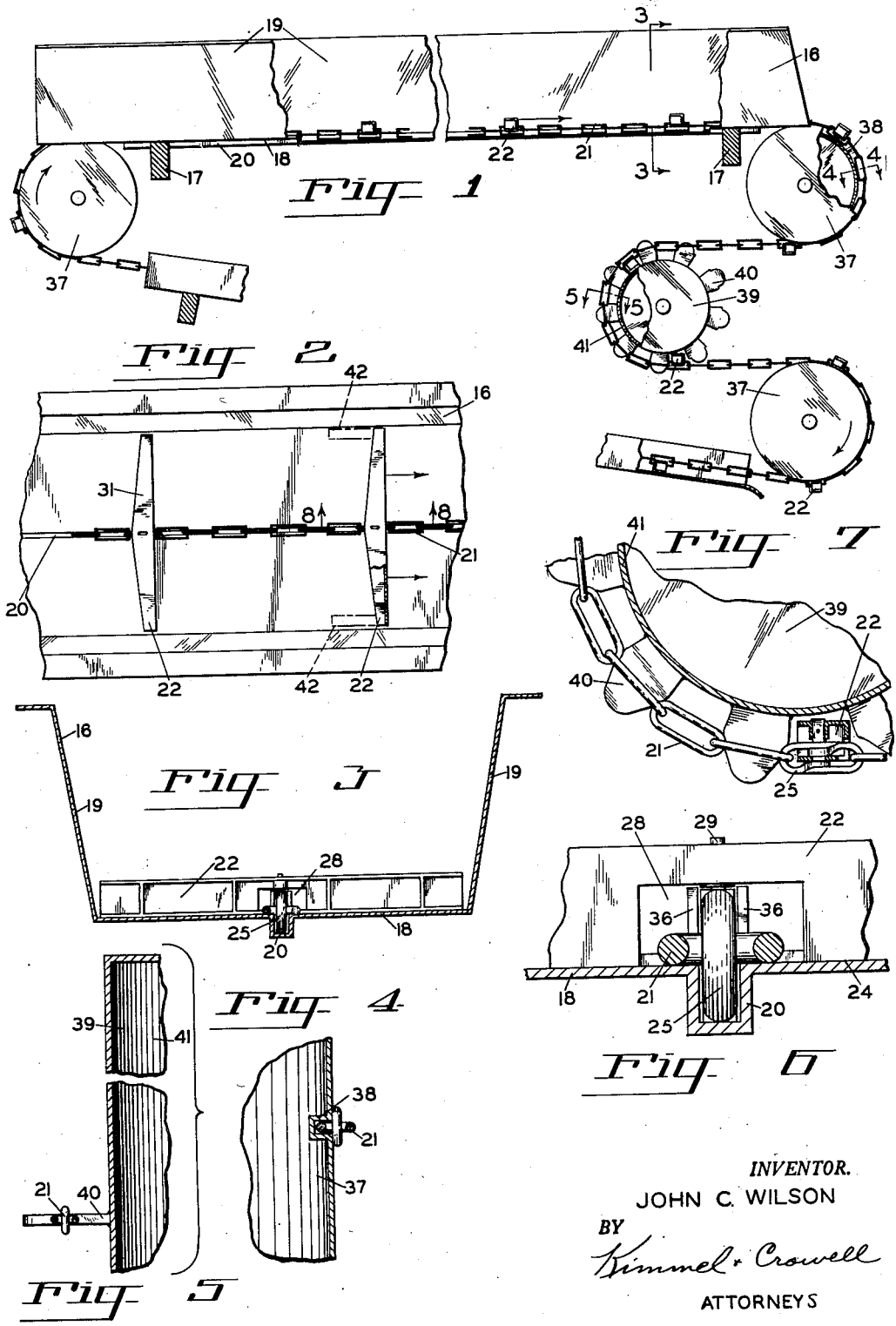

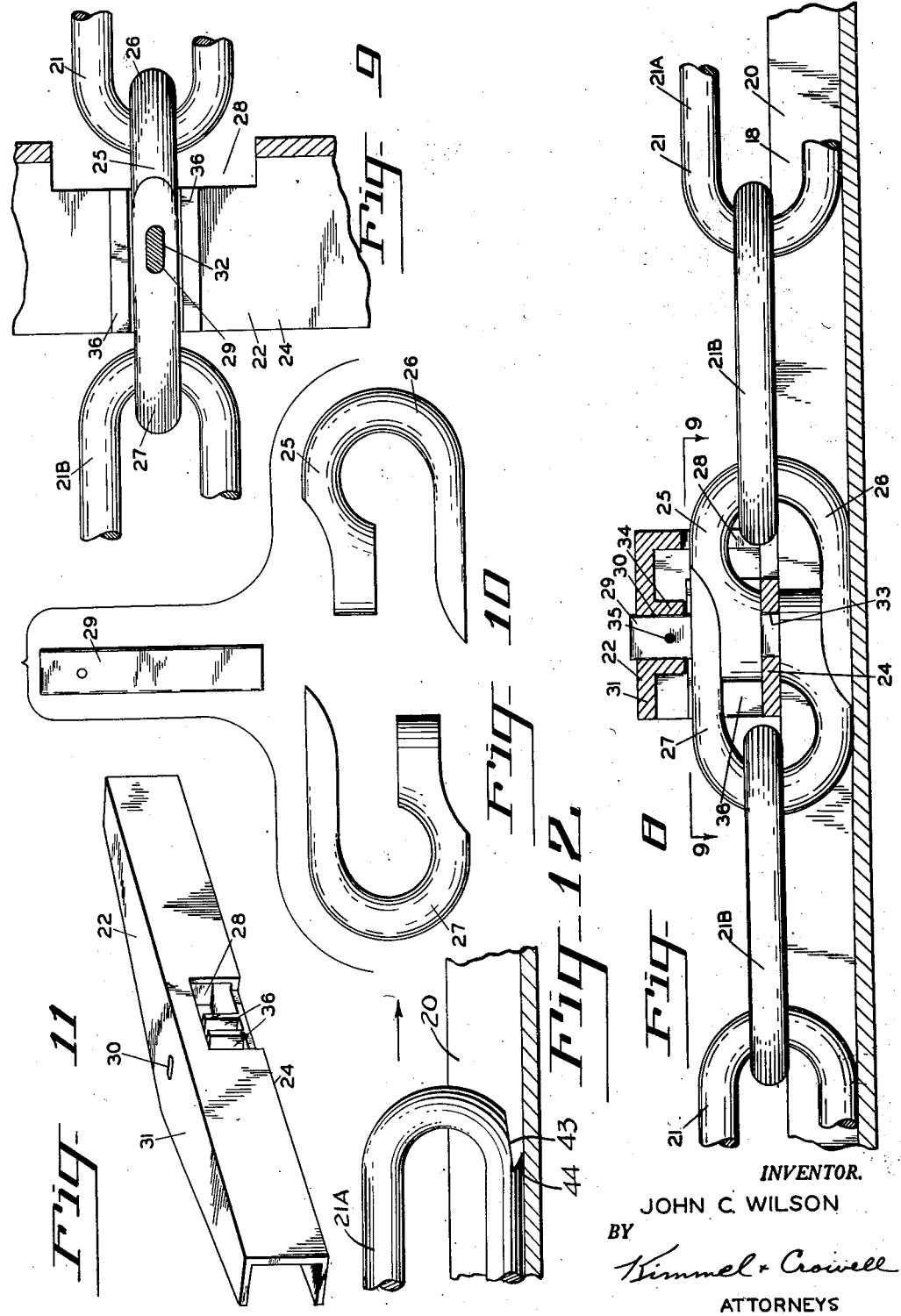

2,799,388
REFUSE CONVEYOR
John C. Wilson, St. Helens, Oreg.
Application May 31, 1955, Serial No. 512,201
2 Claims. (Cl. 198—171)

The present invention relates to improvements in refuse conveyors, and more particularly to such conveyors used in saw mills in the conveying of sawdust, chips, slabs, edgings, and other refuse.

The primary object of the invention is to provide a conveyor of this type in which the conveyor chain is protected from the material being conveyed, to prevent the chain from being fouled by such material.

Another object of the invention is to provide a device of the character described above in which the chain is recessed into the trough and into the conveyor sprockets over which it is trained.

Another object of the invention is to provide a conveyor of the class described in which readily detachable links support the conveyor flights on the chain.

A still further object of the invention is to provide a conveyor of the class described which is inexpensive to manufacture, durable in operation and non-complicated to operate.

Other objects and advantages will become apparent in the following specification when read in light of the attached drawings, in which:

Figure 1 is a side view of the refuse conveyor having the improved chain conveyor structure associated therewith, parts broken away for convenience of illustration.

Figure 2 is a fragmentary plan view of the invention.

Figure 3 is a transverse sectional view of the conveyor trough, taken on line 3—3 of Figure 1, looking in the direction of the arrows.

Figure 4 is a fragmentary sectional detail taken on line 4—4 of Figure 1, looking in the direction of the arrows, illustrating a portion of the idler roller.

Figure 5 is a fragmentary sectional detail taken on line 5—5 of Figure 1, looking in the direction of the arrows.

Figure 6 is an enlarged sectional fragmentary view of the scraper and trough shown in Figure 3.

Figure 7 is a fragmentary view of the driving drum, illustrating the chain and bucket associated with the driving teeth.

Figure 8 is an enlarged fragmentary sectional view taken on line 8—8 of Figure 2, looking in the direction of the arrows.

Figure 9 is a fragmentary sectional view taken on line 9—9 of Figure 8, looking in the direction of the arrows, with parts broken away.

Figure 10 is an exploded view of the links.

Figure 11 is a perspective view of one of the flights or buckets.

Figure 12 is a view similar to Figure 8 illustrating a modified link structure.

In the construction of conveyors heretofore, the chains were connected to the flights or buckets midway of their height, thus allowing sticks and refuse to crowd underneath the chain, raising the chain above the bottom of the trough. When this refuse reached the sprockets or idler rollers, it often caused breakage in the chains and/ or the sprockets, and occasionally injured workmen by throwing portions of the refuse, striking the workmen.

Referring now to the drawings in detail, the reference numeral 16 indicates the conveyor trough which is supported by beams 17 resting on a structure (not shown). The trough 16 comprises a bottom 18 having upwardly extending side walls 19 connected thereto. A longitudinally extending chain guideway 20 projects downwardly through the bottom 18 of the trough 16. A conveyor chain 21 is positioned within the trough 16 and has flights or buckets 22 affixed thereto in the following manner.

The conveyor chain 21 is mounted so as to operate in the guideway 20 with vertical links 21A projecting downwardly into the guideway 20, as best illustrated in Figures 3, 6 and 8, while the horizontal links 21B rest on the bottom surface 18 of the trough 16. The links 21B rest on the bottom 18 of the trough 16 throughout the length of the trough 16. The under sides 24 of the flights or buckets 22 also rest on the bottom 18 of the trough 16, in order to allow the chain 21 to remain within the guideway 20. The chain 21 is secured at a relatively low position to the flights or buckets 22. The connection of the chain 21 to the flight or bucket 22 is illustrated in Figure 8, wherein is disclosed a demountable link 25. The link 25 consists of two parts, 26 and 27, as illustrated in Figure 10. An enlarged opening 28 is formed through the flight or bucket 22, as illustrated in Figures 8 and 11. The section 26 of the link 25 is linked through the link 21B, while the section 27 of the link 25 is linked through the oppositely disposed link 21B. Both sections 26 and 27 embrace the bottom 24 of the flight or bucket 22. A locking bolt or pin 29 extends through the opening 30 of the top 31 of the flight or bucket 22 through the holes 32 of the link sections 26 and 27, and through the opening 33 in the bottom of the flights or buckets 22, as illustrated in Figure 9. The bolt 29 is keyed or locked within the boss 34 by the pin 35.

The flight or bucket 22 is supported at right angles to the chain 21 by transverse guides 36 formed on the flight or bucket 22. The guides 36 are adapted to embrace the sides of the link 25, maintaining the flight 22 at right angles to the chain 21. The chain 21 is trained over the idler sprocket 37 and extends into the annular guide or groove 38, as shown in Figure 4. A drive sprocket 39 is provided with driving teeth 40, which are relatively long, providing spaces therebetween accommodating the flights or buckets 22. The teeth 40 are part of the drum 41 which forms part of the drive sprocket 39.

Referring in detail to Figure 2, the broken lines 42 illustrate trailing extensions which may be used to maintain the flight 22 in right angular relation to the trough 16, as well as assisting in maintaining the flight 22 in vertical position.

When a chain 21 is assembled as illustrated in this invention, it completely prevents sticks and foreign matter from getting beneath the links of the chain 21, which prevents damage to the chain and accidents caused thereby.

In Figure 12 of the drawings, a modification of the link 21A is illustrated with a transverse notch 43, to provide a tooth 44 which engages the bottom of the guideway 20 to prevent any foreign material from accumulating therein.

In the operation of the new and improved refuse conveyor, the flights or buckets 22 are supported on the horizontal links of the chain 21 and rest on the bottom 18 of the trough 16, while the vertical links of the chain 21 run in the guideway 20.

Having thus described the preferred embodiment of the invention, it should be understood that numerous modifications and structural adaptations may be resorted

What is claimed is:

1. A refuse conveyor comprising a trough having a bottom wall and upwardly extending side walls, said bottom wall having a longitudinally extending guideway projecting downwardly therefrom a chain having alternate links thereof engaging said bottom wall in overlying relation to said guideway, said chain having the links connecting said alternate links partially extending downwardly into said guideway, a plurality of flights in said trough with each of said flights including a base portion engaging the bottom wall of said trough and overlying said guideway, a top member positioned in vertically spaced parallel relation to said base portion, a vertical wall extending integrally between said base portion and said top member, a pair of centrally positioned transversely extending spaced apart guide members extending upwardly from said base, said base portion and said top member having aligned centrally positioned apertures formed therein, a pair of identical separable hook members having the upper portions thereof positioned between said base portion and said top member and between said guides and the lower portions thereof extending below said base member, means extending through said apertures in said flight locking said hook members thereto, said hook members engaging adjacent links in said chain securing said flight thereto, and means for moving said chain and said flight through said trough.

2. A device as claimed in claim 1 wherein said links extending into said guideway are provided with a tooth on the forward lower edge thereof for scraping the bottom face of said guideway.

References Cited in the file of this patent

UNITED STATES PATENTS

| | | |
|---|---|---|
| 627,482 | Coleman | June 27, 1899 |
| 811,190 | Webster | Jan. 30, 1906 |
| 829,091 | Stone | Aug. 21, 1906 |
| 881,908 | Demarest | Mar. 17, 1908 |
| 1,001,097 | Turner | Aug. 22, 1911 |
| 2,294,080 | Ehmann | Aug. 25, 1942 |
| 2,699,250 | Keen et al. | Jan. 11, 1955 |